US012377680B2

United States Patent
Lin

(10) Patent No.: US 12,377,680 B2
(45) Date of Patent: Aug. 5, 2025

(54) CASTER WITH A CIRCULARLY POSITIONING STRUCTURE

(71) Applicant: CATIS PACIFIC MFG. CORP. LTD., Yunlin County (TW)

(72) Inventor: Ching Sung Lin, Yunlin County (TW)

(73) Assignee: Catis Pacific Mfg. Corp. Ltd., Douliou (TW)

( * ) Notice: Subject to any disclaimer, the term of this patent is extended or adjusted under 35 U.S.C. 154(b) by 439 days.

(21) Appl. No.: 17/938,845

(22) Filed: Oct. 7, 2022

(65) Prior Publication Data

US 2024/0116311 A1  Apr. 11, 2024

(51) Int. Cl.
*B60B 33/00* (2006.01)

(52) U.S. Cl.
CPC ...... *B60B 33/0084* (2013.01); *B60B 33/0049* (2013.01)

(58) Field of Classification Search
CPC .................. B60B 33/0084; B60B 33/0081
See application file for complete search history.

(56) References Cited

U.S. PATENT DOCUMENTS

| | | | | |
|---|---|---|---|---|
| 6,321,878 B1 * | 11/2001 | Mobley | ............... | B60B 33/0057 188/1.12 |
| 2010/0122430 A1 * | 5/2010 | Ahn | .................... | B60B 33/0073 16/37 |

FOREIGN PATENT DOCUMENTS

| | | | | |
|---|---|---|---|---|
| CN | 101304716 A | * | 11/2008 | ............. A61G 7/018 |
| DE | 4041512 A1 | * | 6/1992 | |
| EP | 3572239 A1 | * | 11/2019 | ........... A61G 7/0528 |
| WO | WO-2022068978 A1 | * | 4/2022 | ......... B60B 33/0021 |

OTHER PUBLICATIONS

CN-101304716-A—English Machine Translation (Year: 2008).*
DE4041512A1—English Machine Translation (Year: 1992).*

* cited by examiner

*Primary Examiner* — Melanie Torres Williams
(74) *Attorney, Agent, or Firm* — Wang Law Firm, Inc.

(57) ABSTRACT

For a caster with a circularly positioning structure, stepping on the pedal can drive the driving rod and the driving piece to rotate, so that the positioning pin of the driving piece cyclically proceeds the first positioning point, the second positioning point and the path point of the positioning member, thereby driving the cam unit to push against the shaft to let the positioning piece and the orienting hole to be engaged or disengaged from each other, and let the locking end of the locking member to be engaged in or disengaged from the locking groove. In this way, the caster can selectively be locked to stop rotation, and be released to freely rotate.

7 Claims, 10 Drawing Sheets

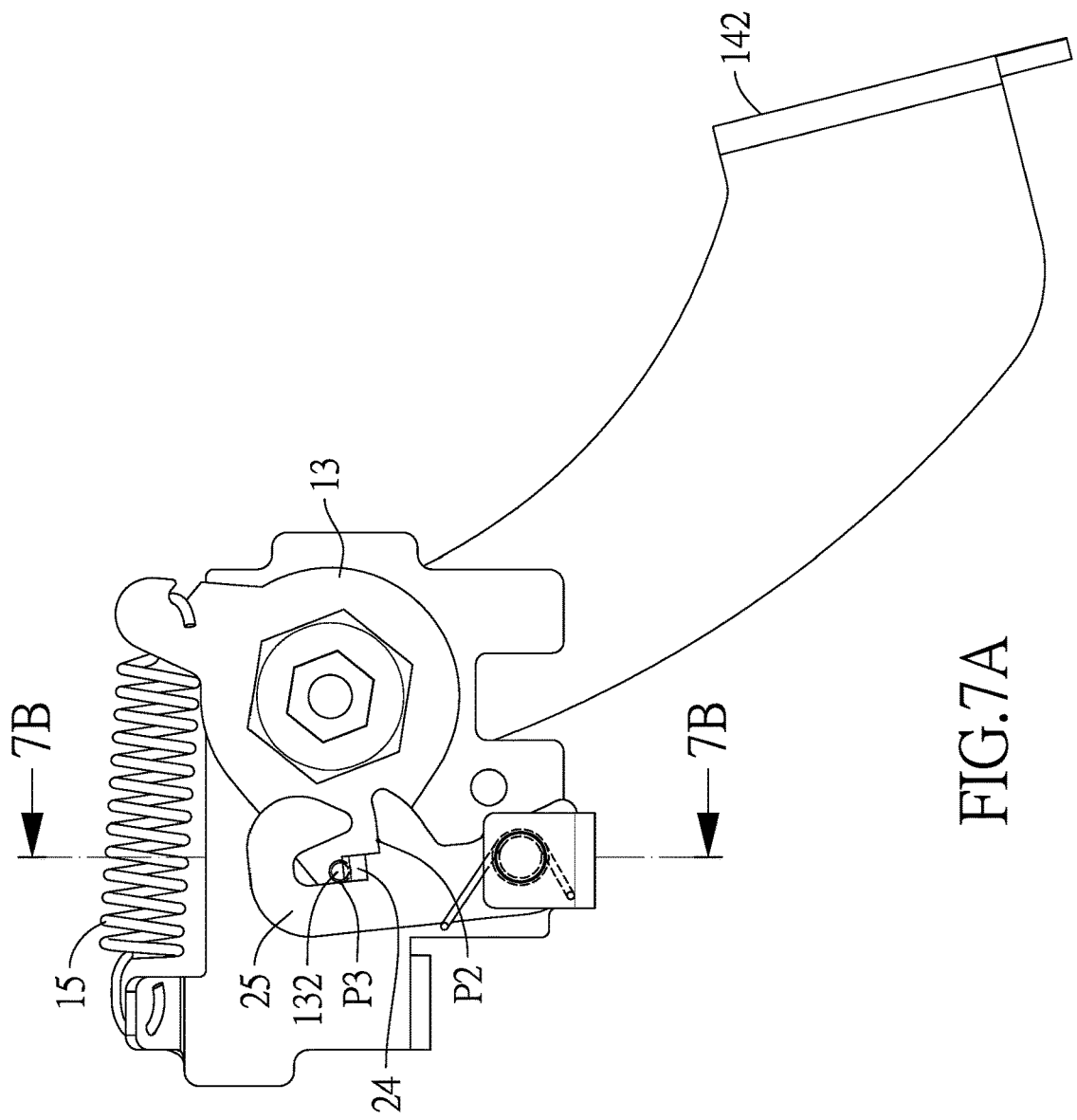
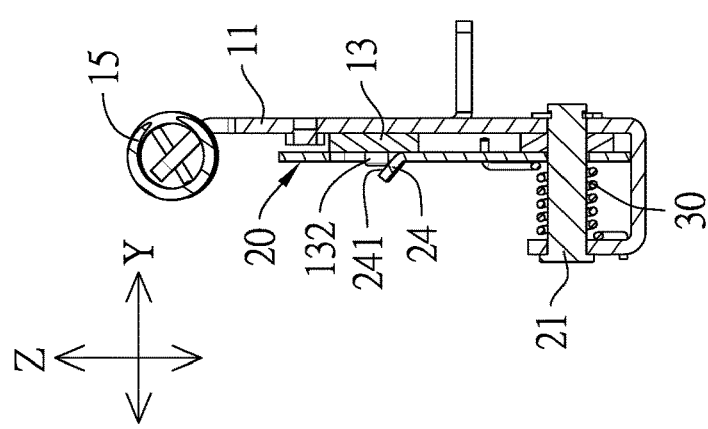
FIG.7A
FIG.7B

CASTER WITH A CIRCULARLY POSITIONING STRUCTURE

BACKGROUND

Field of the Invention

The present invention relates to a caster, and more particularly to a caster with a circularly positioning structure.

Description of Related Art

Generally, in order to make the movement of the carrier (e.g. patient bed, precision instrument or workbench, etc.) convenient and labor-saving, casters are usually provided at the bottom of the carrier, and after the carrier moves to a destination through the casters, the casters must remain stationary by extra stop members. The aforementioned stop member achieves the effect of stopping the caster by a rake pedal for being stepped on. When the caster needs to be released, a release pedal can be stepped on to release the caster. However, the rake pedal is near the release pedal, so the problem of stepping on the wrong pedal is easy to occur.

In view of this, it is indeed necessary to provide a technical means to solve the aforementioned problem.

SUMMARY

One objective of the present invention is to solve the problem of unexpectedly stepping on a wrong one of two pedals that the caster relies on for being stopped and released.

To achieve the above objective, the present invention according to an embodiment provides a caster with a circularly positioning structure, and the caster includes:

a driving assembly including a driving rod pivotally connected to a bracket, and a driving piece fixed on the driving rod, and the driving piece including a protruding portion and a positioning pin disposed on the protruding portion;

a positioning member including:

a pivoting portion pivotally connected to the bracket through a pivot rod;

a first positioning portion protruding toward the driving piece;

a second positioning portion connected to the first positioning portion and the pivoting portion, and the second positioning portion including a guiding slope inclined toward the bracket; and a third positioning portion that is connected to the pivoting portion and the second positioning portion, wherein periphery of the positioning member includes a first positioning point located between a side of the first positioning portion that is closer to the pivot rod, and a side of the pivoting portion, a second positioning point located between the second positioning portion and the first positioning portion, and a path point located between the third positioning portion and the second positioning portion;

an elastic member sleeved on the pivot rod, one of two opposite ends of the elastic member being fixed to the bracket, and the other one of the two opposite ends of the elastic member being fixed to the positioning member;

a cam unit including a cam fixed to the driving rod, the cam including a first positioning portion and a second positioning portion recessed from an edge thereof, the first positioning portion including a first bottom surface, and the second positioning portion including a second bottom surface, wherein a distance between the first bottom surface and the driving rod is greater than a distance between the second bottom surface and the driving rod, and the cam unit further includes an abutting member continuously abutting against the cam;

a shaft connected to the abutting member;

an orienting unit including an orienting member sleeved on and fixed to the shaft, and a positioning piece sleeved on the shaft and movable with the shaft, the orienting member including an orienting hole for insertion of the shaft, and the positioning piece including a clamping portion protruding from a peripheral edge thereof; and a caster assembly fixed to the driving assembly.

Optionally, the elastic member is a torsion spring.

Optionally, the caster assembly includes a caster for rolling on the ground.

Optionally, the driving assembly further includes a treadable structure disposed on the driving rod, the treadable structure includes two side plates fixed to the driving rod, and a pedal connected to the two side plates.

Optionally, the driving assembly further includes a compression spring, one of two opposite ends of the compression spring is fixed to the driving piece, and the other one of the two opposite ends of the compression spring is fixed to the bracket.

Optionally, the driving rod has a polygon cross section, the driving piece includes a polygonal hole, and the driving piece is sleeved on the driving rod through the polygonal hole.

Optionally, the positioning member further includes a hook portion connected to the third positioning portion, the hook portion includes a hook surface facing the driving rod, a gap is formed between the hook portion and the first positioning portion, and the hook surface is inclined toward the gap.

The user drives the driving piece to rotate by stepping on the pedal, so that the positioning pin of the driving piece cyclically proceeds the first positioning point, the second positioning point and the path point, thereby driving the cam unit to push against the shaft to enable the positioning piece to be engaged in or disengaged from the orienting hole. In this way, stopping and releasing the caster can be achieved.

BRIEF DESCRIPTION OF THE DRAWINGS

FIG. 7A is a side view illustrating the positioning pin moving to a path point;

FIG. 7B is a cross-sectional view taking along the cross-section line of FIG. 7A;

DETAILED DESCRIPTION

Figure 1:
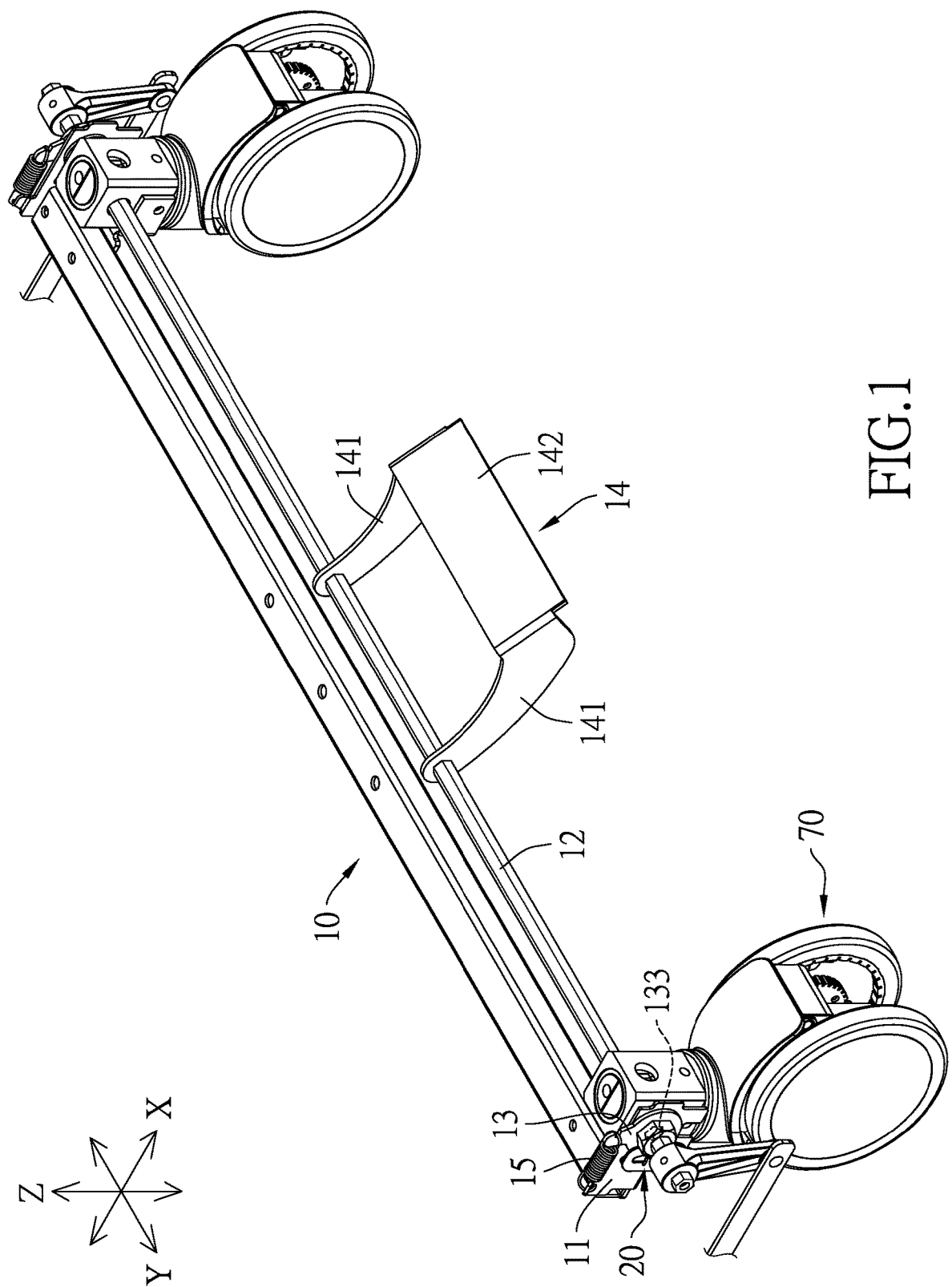
FIG. 1 is a perspective view of the present invention in an embodiment.
Figure 2:
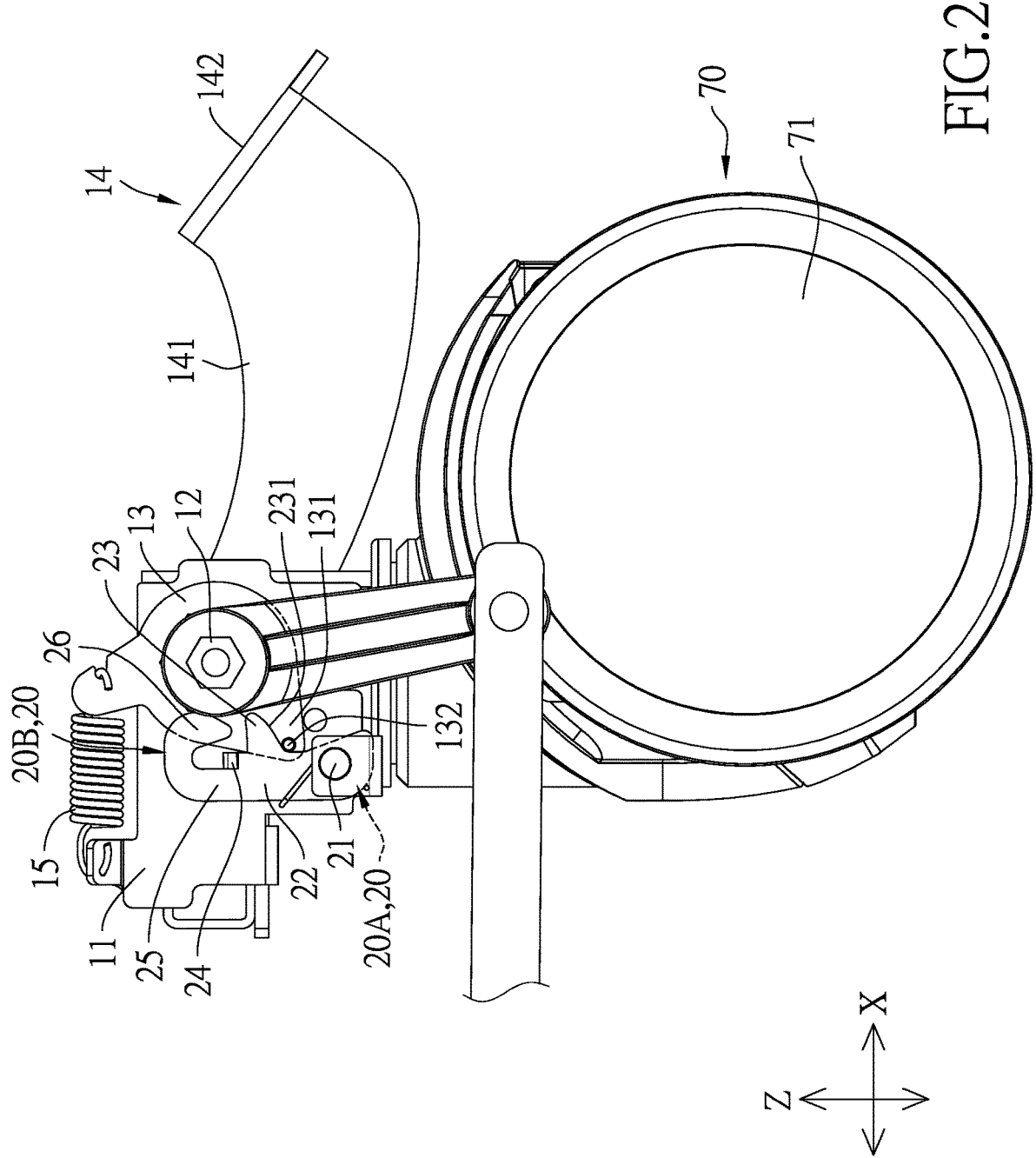
FIG. 2 is a side view of the present invention in an embodiment.

Please refer to FIGS. 1-10, the present invention according to an embodiment is a caster with a circularly positioning structure, and the caster essentially includes a driving assembly 10, a positioning member 20, an elastic member 30, a cam unit 40, a shaft 50, an orienting unit 60 and a caster assembly 70.

The driving assembly 10 includes a bracket 11, a driving rod 12 pivotally connected to the bracket 11, and a driving piece 13 fixed on the driving rod 12. The driving piece 13 includes a protruding portion 131 and a positioning pin 132 disposed on the protruding portion 131, and preferably, the positioning pin 132 is slightly protruding from the driving piece 13, wherein the extension direction of the bracket 11 and the driving rod 12 is defined as a transverse direction Y.

The positioning member 20 is pivotally connected to the bracket 11 through a pivot rod 21. The positioning member 20 includes a first end 20A and a second end 20B opposite to the first end 20A, and an extension direction between the first end 20A and the second end 20B is defined as a height direction Z which is perpendicular to the transverse direction Y. The first end 20A is pivotally connected to the bracket 11, the positioning member 20 includes a pivoting portion 22, the pivoting portion 22 is pivotally connected to the bracket 11 through the pivot rod 21, and the first end 20A is located at the pivoting portion 22. The positioning member 20 further includes a first positioning portion 23, and the first positioning portion 23 is connected to a side of the pivoting portion 22 that is closer to the driving rod 12. The first positioning portion 23 extends along a longitudinal direction X, and the longitudinal direction X is perpendicular to the transverse direction Y, so that the first positioning portion 23 extends toward the driving rod 12. The periphery of the positioning member 20 includes a first positioning point P1 located between a side of the first positioning portion 23 that is closer to the pivot rod 21, and a side of the pivoting portion 22 that is closer to the driving rod 12. The positioning member 20 further includes a second positioning portion 24 connected to the first positioning portion 23 and the pivoting portion 22, and the periphery of the positioning member 20 further includes a second positioning point P2 located between the second positioning portion 24 and the first positioning portion 23. Please refer to FIG. 7B, the second positioning portion 24 includes a guiding slope 241 inclined toward the bracket 11. The positioning member 20 further includes a third positioning portion 25, and the third positioning portion 25 is connected to the pivoting portion 22 along the height direction Z. The second end 20B is located at the third positioning portion 25, the third positioning portion 25 is also connected to the second positioning portion 24, and the periphery of the positioning member 20 further includes a path point P3 located between the third positioning portion 25 and the second positioning portion 24.

In this or other embodiments, a guide arc surface 231 is formed on a side of the first positioning portion 23 closer to the pivot rod 21, and the guide arc surface 231 is adjacent to the first positioning point P1.

The elastic member 30 is sleeved on the pivot rod 21, one of two opposite ends of the elastic member 30 is fixed to the bracket 11, and the other one of the two opposite ends of the elastic member 30 is fixed to the positioning member 20. In this embodiment, the elastic member 30 is a torsion spring, and two opposite ends of the torsion spring are respectively fixed on the positioning member 20 and the bracket 11, so the positioning member 20 can be pulled toward the driving rod 12 through the elasticity of the torsion spring. However, the present invention is not limited to such a type of the elastic member 30.

Figure 9:
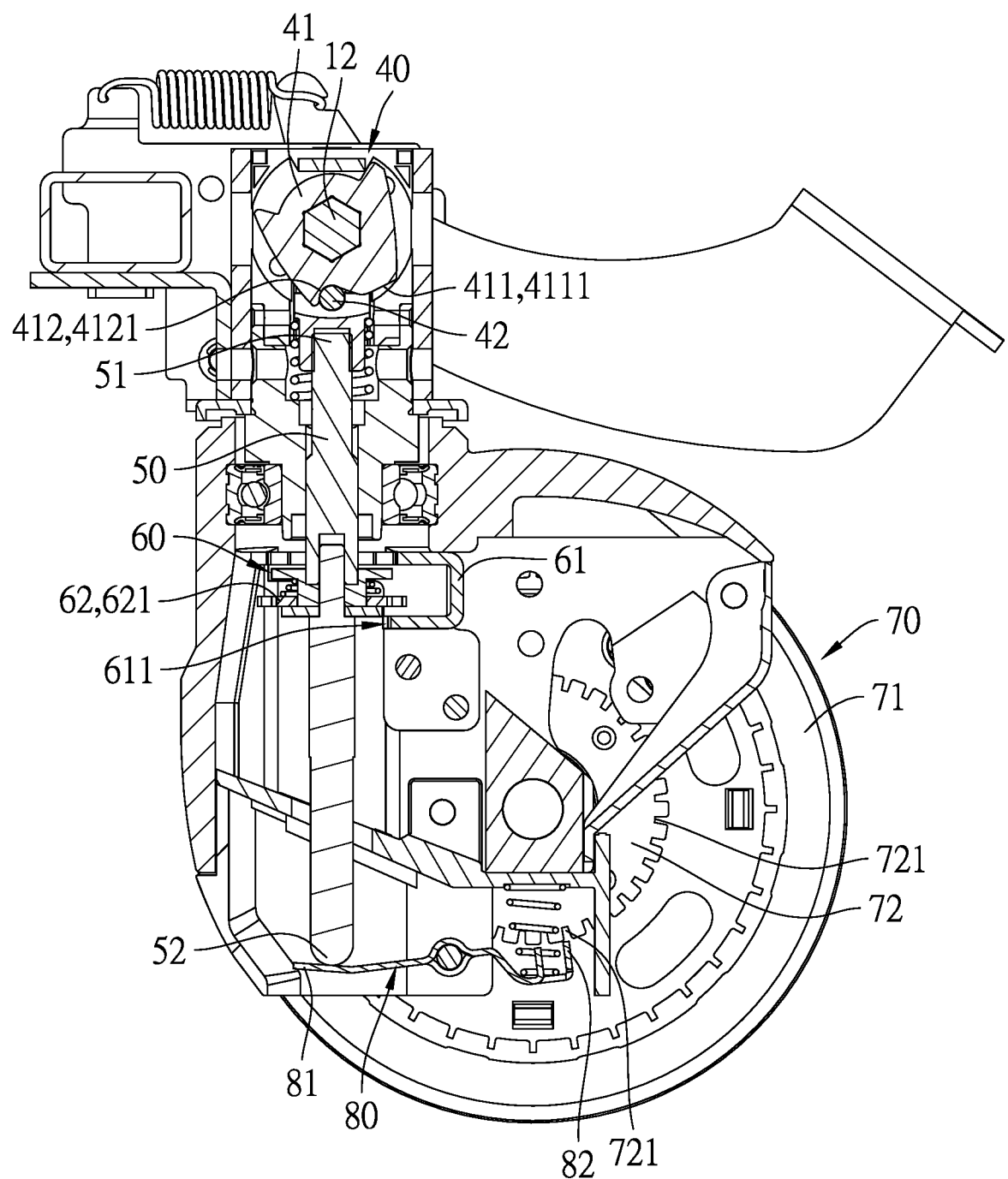
FIG. 9 is a side sectional view illustrating the caster assembly in a released state.
Figure 10:
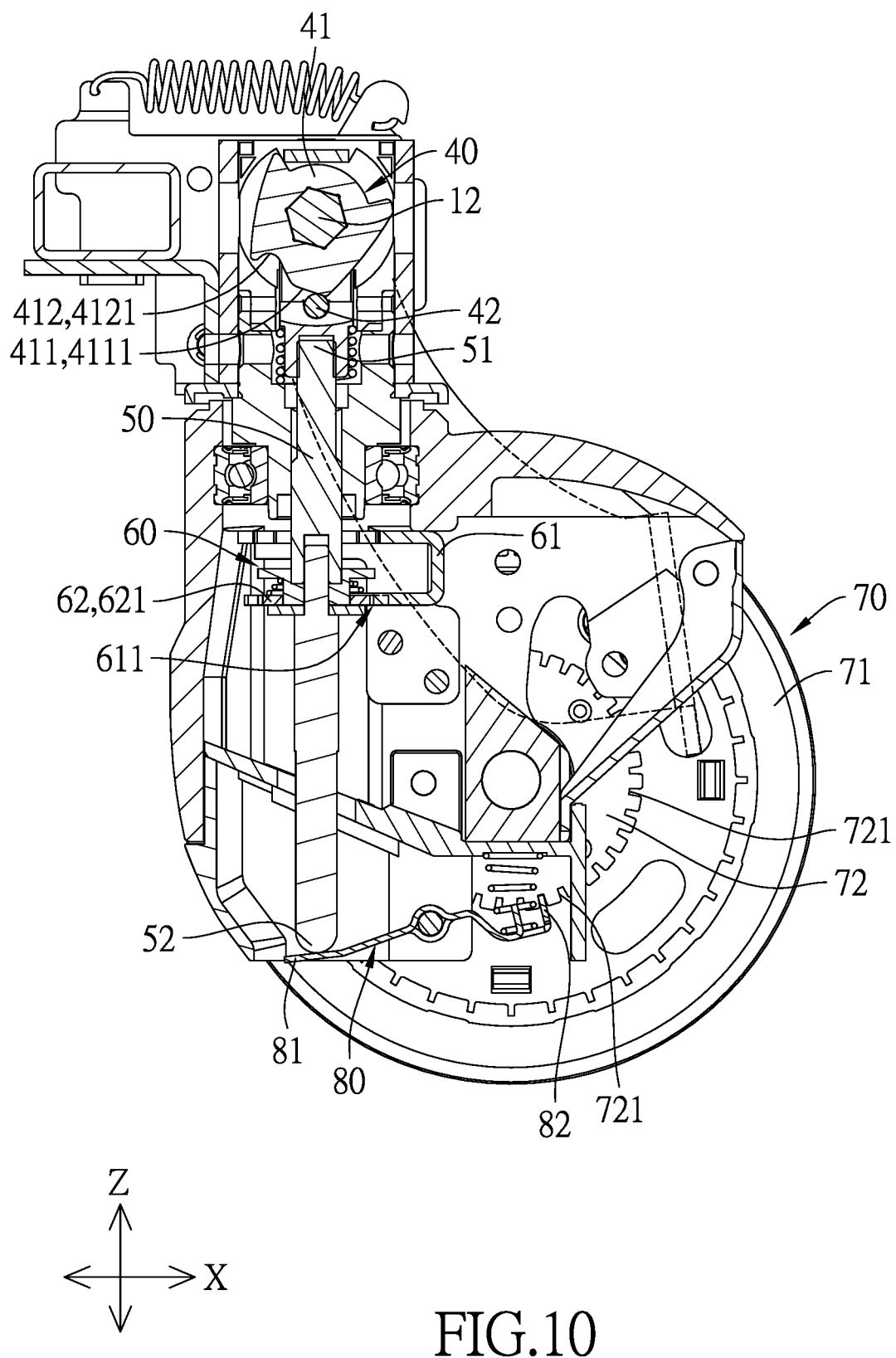
FIG. 10 is a side cross-sectional view of the caster assembly in a stationary state.

Please refer to FIGS. 9 and 10, the cam unit 40 includes a cam 41 fixed to the driving rod 12, the cam 41 includes a first positioning portion 411 and a second positioning portion 412 both recessed from an edge thereof, the first positioning portion 411 includes a first bottom surface 4111, the second positioning portion 412 includes a second bottom surface 4121, and a distance between the first bottom surface 4111 and the driving rod 12 is greater than a distance between the second bottom surface 4121 and the driving rod 12. The cam unit 40 further includes an abutting member 42 continuously abutting against the cam 41.

One of two opposite ends of the shaft 50 is connected to the abutting member 42, and is defined as a first end 51, and the other one of the two opposite ends of the shaft 50 is a second end 52.

The orienting unit 60 includes an orienting member 61 sleeved and fixed on the shaft 50, and a positioning piece 62 sleeved on the shaft 50 and movable with the shaft 50. The orienting member 61 includes an orienting hole 611 for insertion of the shaft 50, and the positioning piece 62 includes a clamping portion 621 protruding from the peripheral edge thereof and configured to engage with the orienting hole 611.

The caster assembly 70 is connected to the driving assembly 10. In this embodiment, the caster assembly 70 includes a wheel 71 for rolling on the ground, the wheel 71 includes a locking gear 72 on an inner side thereof, and the locking gear 72 is approximately circular and includes a plurality of locking grooves 721 on an outer peripheral edge thereof.

A locking member 80 is approximately a sheet member and pivotally installed to the caster assembly 70. The locking member 80 includes an butting end 81 and a locking end 82 opposite to the butting end 81, the second end 52 of the shaft 50 is abutted against the abutting end 81, and the locking end 82 is provided for being locked in one of the locking grooves 721, so as to stop the wheel 71. When the locking end 82 is disengaged from the locking groove 721, the wheel 71 is in a rollable state.

In this embodiment, please refer to FIG. 1, the driving assembly 10 further includes a treadable structure 14 disposed on the driving rod 12, and the treadable structure 14 includes two side plates 141 fixed to the driving rod 12, and a pedal 142 connected to the two side plates 141. Stepping on the pedal 142 can enable the rotation of the driving rod 12.

Moreover, the driving assembly 10 further includes a compression spring 15 extending along the longitudinal direction X, one of two opposite ends of the compression spring 15 is fixed to the driving piece 13, and the other one of the two opposite ends of the compression spring 15 is fixed to the bracket 11. The driving piece 13 is pulled by the compression spring 15, so that after the treadable structure 14 is trodden on and then released, the compression spring 15 can drive the driving piece 13 to return its original position.

Furthermore, the cross-section of the driving rod 12 is a polygon, and the driving piece 13 includes a polygonal hole 133. The driving piece 13 is sleeved on the driving rod 12 through the polygonal hole 133, so that the driving piece 13 is fixed to the driving rod 12 and is drivable by the driving rod 12 in rotation.

The positioning member 20 further includes a hook portion 26 connected to the third positioning portion 25, and the hook portion 26 includes a hook surface 261 facing the driving rod 12. Between the hook portion 26 and the first positioning portion 23 is formed a gap 27, and the hook surface 261 is inclined toward the gap 27. When the user steps on the pedal 142 to enable the positioning pin 132 to shift along the guide arc surface 231 to abut against the hook surface 261, the positioning pin 132 will be guided by the hook surface 261 to fall into the gap 27, so that the positioning pin 132 will be positioned at the second positioning point P2.

The above description exemplarily explains the structural configuration and the connection relationship of the present invention. The way of use and the technical effects of the present invention can produce as follows.

Figure 3:
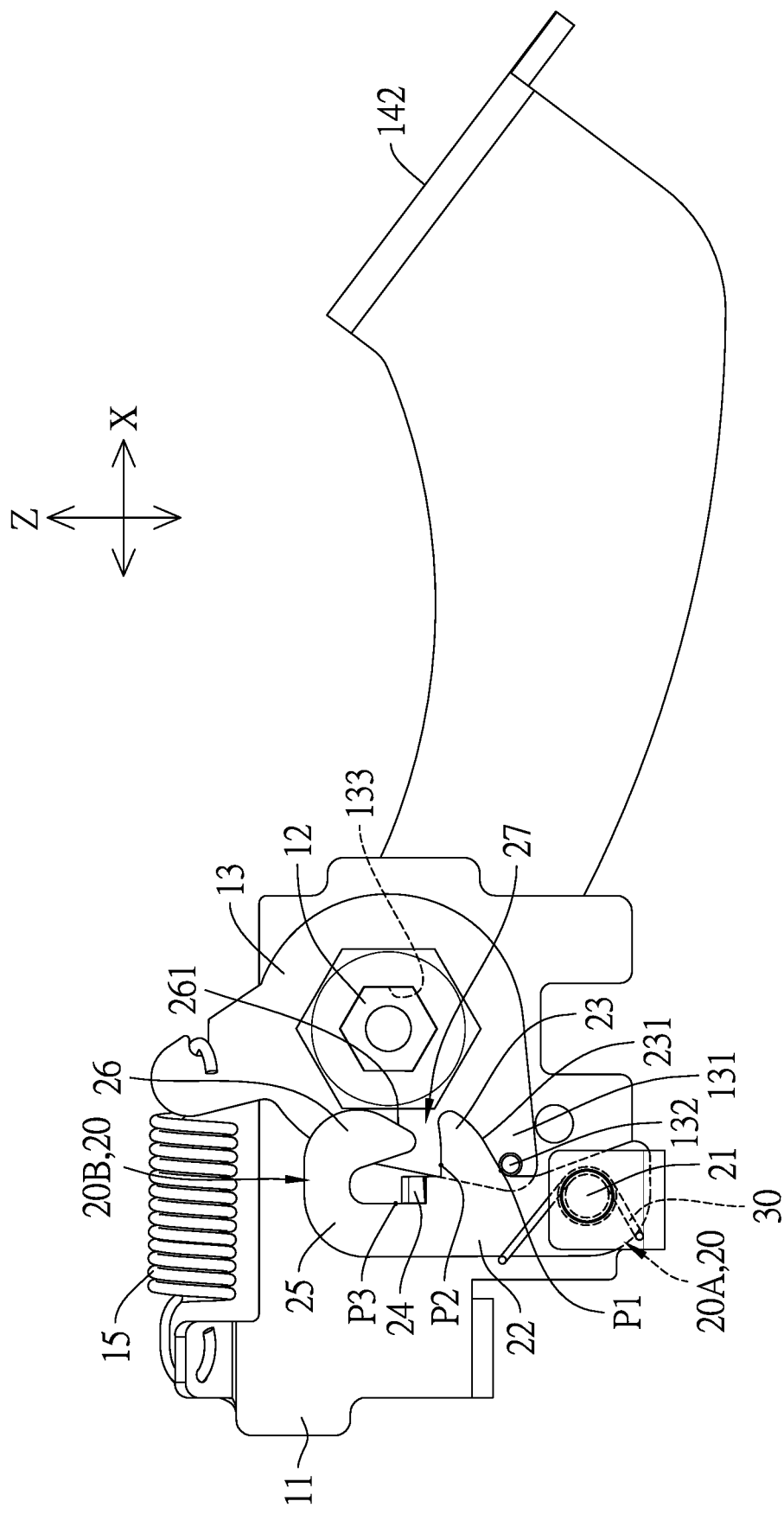
FIG. 3 is a magnified view of a part of a side view of the present invention in an embodiment.

Please refer to FIG. 3, in the released state, the wheel 71 is able to rotate freely, and the positioning pin 132 is located at the first positioning point P1 and abuts against the first positioning portion 23. Please refer to FIG. 9, the abutting member 42 is abutted against the second bottom surface 4121, and because the distance between the first bottom surface 4111 and the driving rod 12 is greater than the distance between the second bottom surface 4121 and the driving rod 12, the abutting member 42 is closer to the driving rod 12. Moreover, the positioning piece 62 is disengaged from the orienting hole 611. Since the positioning piece 62 is not restricted by the orienting hole 611, the caster assembly 70 can rotate freely. Furthermore, the locking end 82 is also not locked in the locking grooves 721, so the wheel 71 can move freely.

Figure 4:
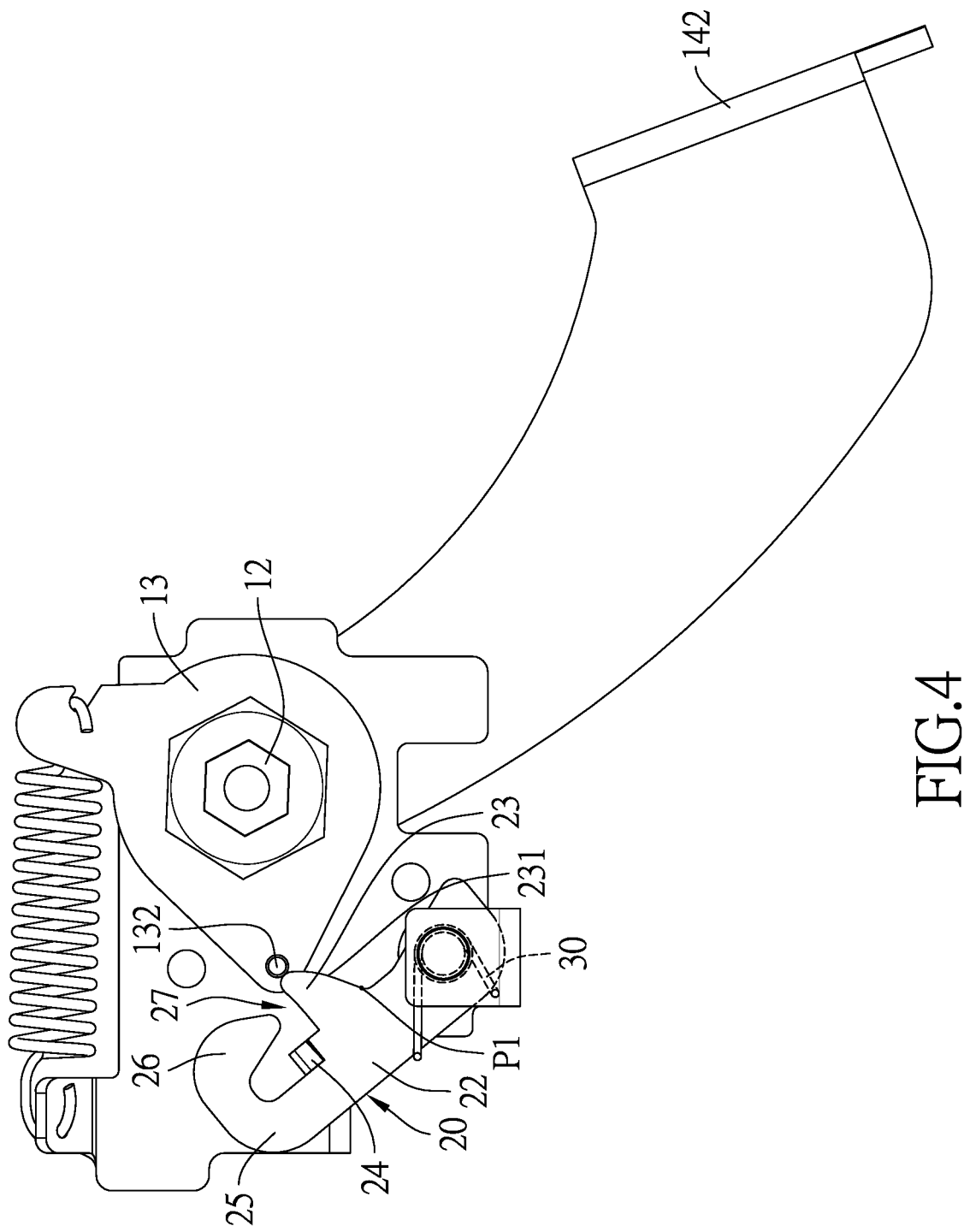
FIG. 4 is a side view illustrating the positioning pin moving from the first positioning point to the second positioning point.
Figure 5:
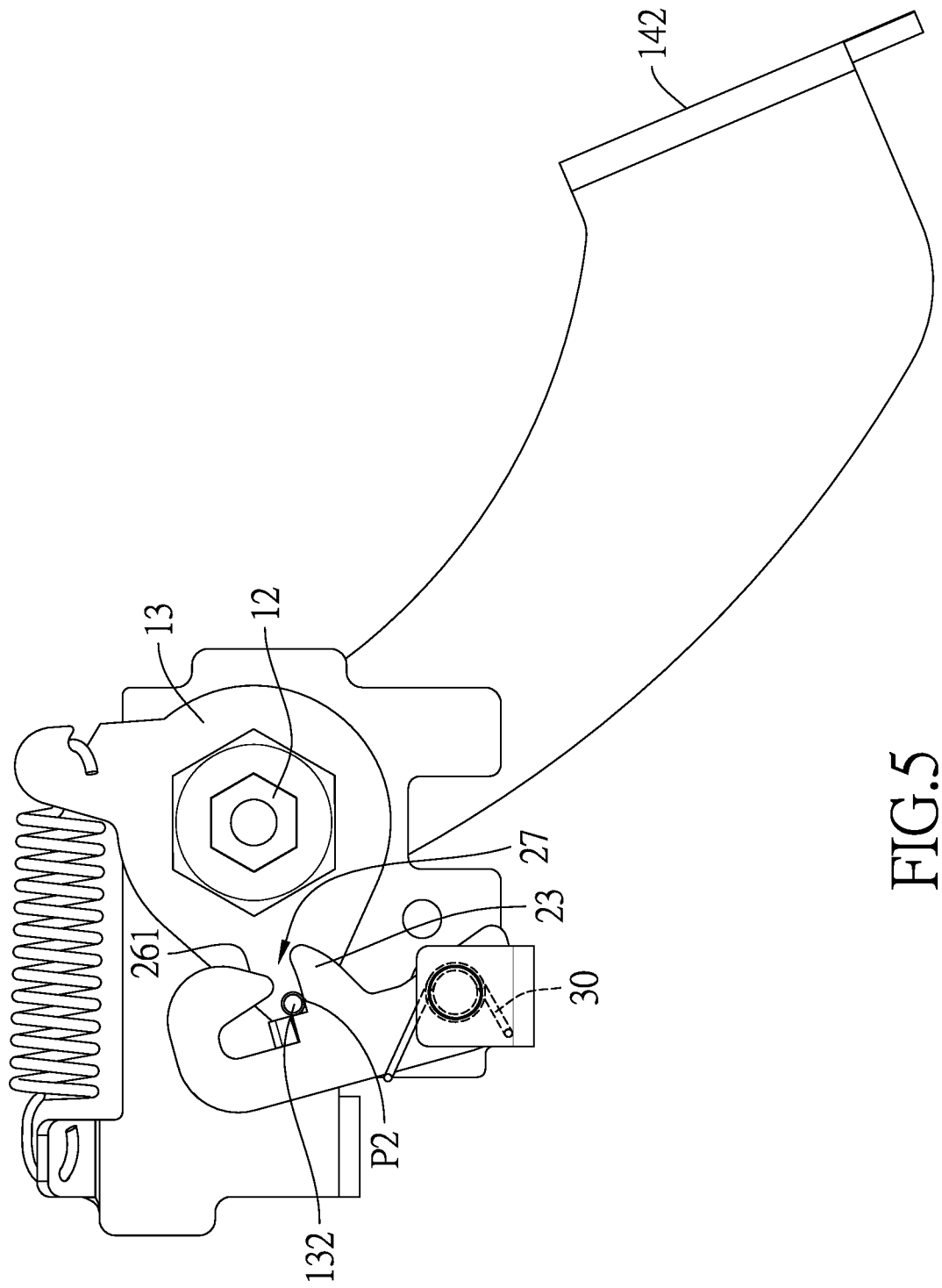
FIG. 5 is a side view illustrating the positioning pin positioned at the second positioning point.

Please refer to FIGS. 3 and 4, when the user steps on the pedal 142, the driving rod 12 is driven to rotate through the pedal 142, and the driving piece 13 is driven to rotate by the driving rod 12, so that the positioning pin 132 moves from the first positioning point P1 along the guide arc surface 231 toward the gap 27 while abutting against the guide arc surface 231. Since the positioning pin 132 is slightly protruded from the driving piece 13, the positioning pin 132 moving along the guide arc surface 231 pushes the positioning member 20 to pivot on the pivot rod 21 toward the longitudinal direction X. when the positioning pin 132 moves from the guide arc surface 231 to the hook surface 261, and the positioning pin 132 abuts against the hook surface 261. After the user releases the pedal 142, please refer to FIG. 5, the positioning pin 132 is guided by the hook surface 261 and falls into the gap 27 and then is positioned at the second positioning point P2 since the first positioning portion 23 is driven by the elastic member 30 to rotate towards the driving rod 12.

Please refer to FIG. 10, since the cam 41 is driven to rotate, the first bottom surface 4111 of the cam 41 abuts against the abutting member 42 and the distance between the first bottom surface 4111 and the driving rod 12 is greater than the distance between the second bottom surface 4121 and the driving rod 12, the abutting member 42 is pushed to drive the shaft 50 to move in a direction away from the driving rod 12, so as to drive the positioning piece 62 to fall into the orienting hole 611. Because the positioning piece 62 is restricted by the orienting hole 611 and cannot rotate in circumferential direction, the shaft 50 fixed to the positioning piece 62 cannot rotate in the circumferential direction either, whereby the caster assembly 70 cannot be rotated arbitrarily. At this time, the locking end 82 is also locked in the locking grooves 721, so the wheel 71 is in the stationary state.

Figure 6:
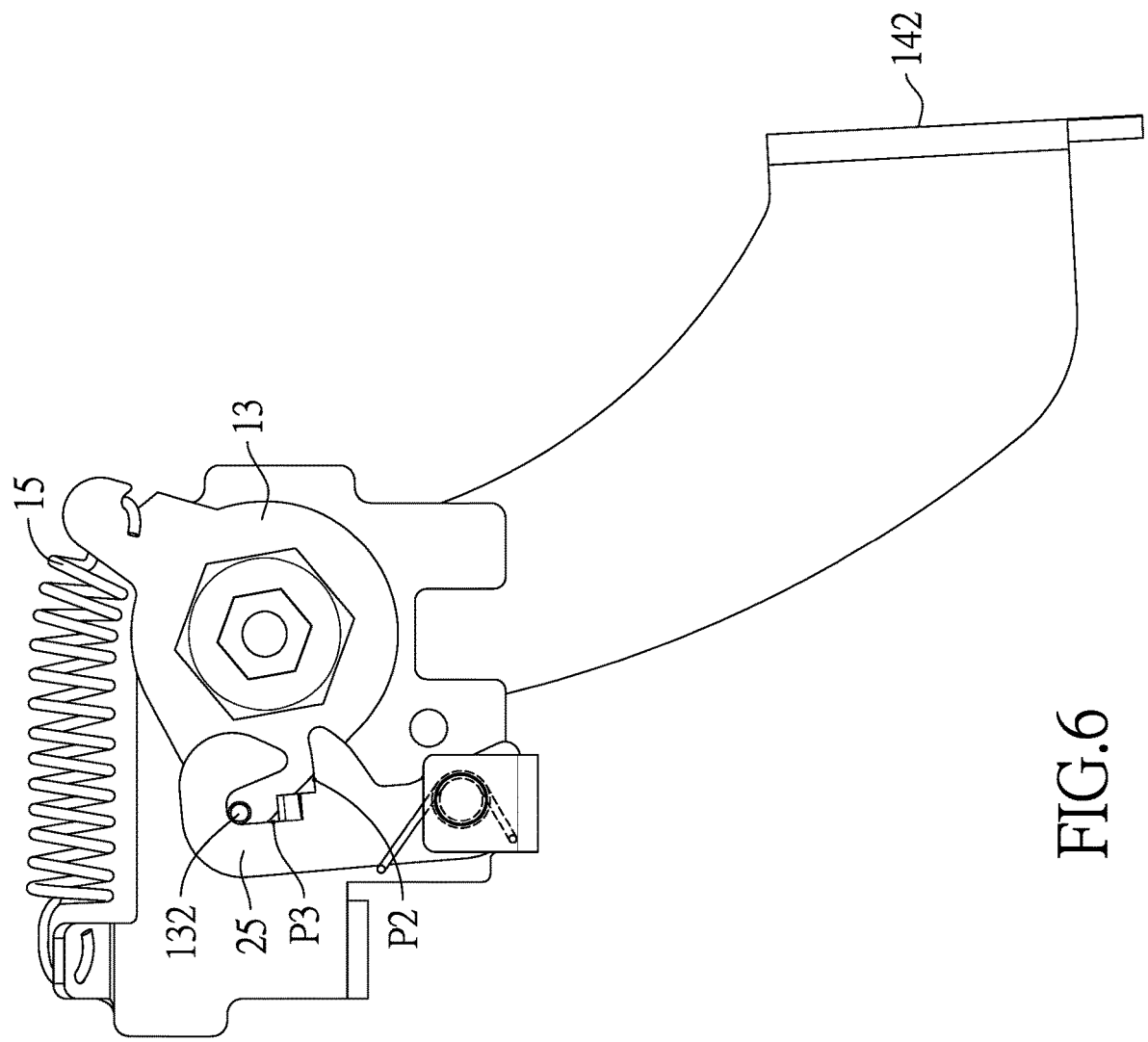
FIG. 6 is a side view illustrating the positioning pin leaving the second positioning point.

Please refer to FIGS. 6, 7A and 7B. When the user steps on the pedal 142 again, the positioning pin 132 leaves the second positioning point P2 and abuts against the third positioning portion 25. Then, after the user releases the pedal 142, the driving piece 13 is rotated due to the pulling of the compression spring 15 so that the positioning pin 132 is moved to the path point P3.

Figure 8A:
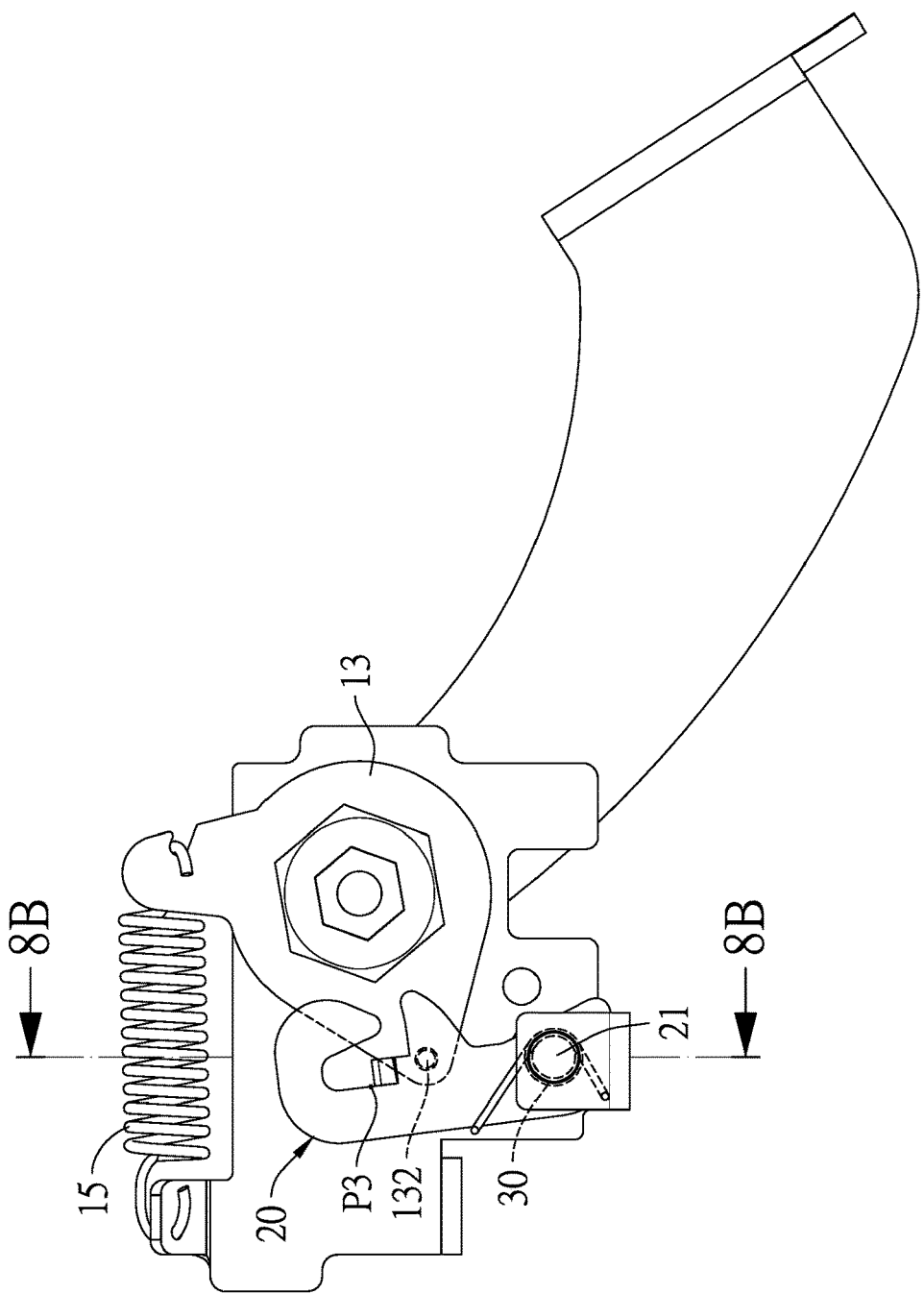
FIG. 8A is a side view illustrating the positioning pin pushing the positioning member to compress the elastic member.
Figure 8B:
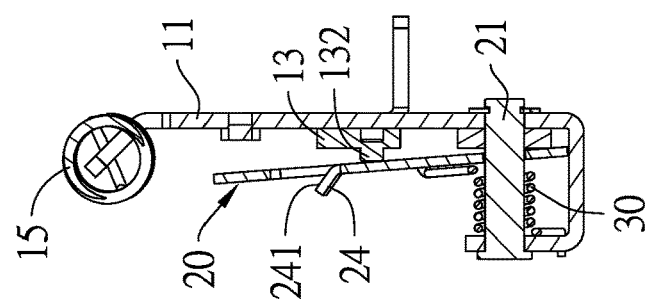
FIG. 8B is a cross-sectional view based on the cross-section line of FIG. 8A.

Please refer to FIGS. 8A and 8B, when the positioning pin 132 located at the path point P3 is guided by the guiding slope 241 to push the positioning member 20 to swing outward along the transverse direction Y to compress the elastic member 30, the compression spring 15 pulls the driving piece 13 to pivot and return to its original position, so that the positioning pin 132 returns to the first positioning point P1. In this way, the caster assembly 70 is returned to a freely movable and rotatable state.

What is claimed is:

1. A caster with a circularly positioning structure, comprising:
a driving assembly including a driving rod pivotally connected to a bracket, and a driving piece fixed on the driving rod, and the driving piece including a protruding portion and a positioning pin disposed on the protruding portion;
a positioning member including:
a pivoting portion pivotally connected to the bracket through a pivot rod;
a first positioning portion protruding toward the driving piece;
a second positioning portion connected to the first positioning portion and the pivoting portion, and the second positioning portion including a guiding slope inclined toward the bracket; and
a third positioning portion that is connected to the pivoting portion and the second positioning portion, wherein periphery of the positioning member includes a first positioning point located between a side of the first positioning portion that is closer to the pivot rod, and a side of the pivoting portion, a second positioning point located between the second positioning portion and the first positioning portion, and a path point located between the third positioning portion and the second positioning portion;
an elastic member sleeved on the pivot rod, one of two opposite ends of the elastic member being fixed to the bracket, and the other one of the two opposite ends of the elastic member being fixed to the positioning member;
a cam unit including a cam fixed to the driving rod, the cam including a first positioning portion and a second positioning portion recessed from an edge thereof, the first positioning portion including a first bottom surface, and the second positioning portion including a second bottom surface, wherein a distance between the first bottom surface and the driving rod is greater than a distance between the second bottom surface and the driving rod, and the cam unit further includes an abutting member continuously abutting against the cam;

a shaft connected to the abutting member;

an orienting unit including an orienting member sleeved on and fixed to the shaft, and a positioning piece sleeved on the shaft and movable with the shaft, the orienting member including an orienting hole for insertion of the shaft, and the positioning piece including a clamping portion protruding from a peripheral edge thereof; and a caster assembly fixed to the driving assembly.

2. The caster with the circularly positioning structure as claimed in claim 1, wherein the elastic member is a torsion spring.

3. The caster with the circularly positioning structure as claimed in claim 1, wherein the caster assembly includes a wheel for rolling on the ground.

4. The caster with the circularly positioning structure as claimed in claim 1, wherein the driving assembly further includes a treadable structure disposed on the driving rod, the treadable structure includes two side plates fixed to the driving rod, and a pedal connected to the two side plates.

5. The caster with the circularly positioning structure as claimed in claim 1, wherein the driving assembly further includes a compression spring, one of two opposite ends of the compression spring is fixed to the driving piece, and the other one of the two opposite ends of the compression spring is fixed to the bracket.

6. The caster with the circularly positioning structure as claimed in claim 1, wherein the driving rod has a polygon cross section, the driving piece includes a polygonal hole, and the driving piece is sleeved on the driving rod through the polygonal hole.

7. The caster with the circularly positioning structure as claimed in claim 1, wherein the positioning member further includes a hook portion connected to the third positioning portion, the hook portion includes a hook surface facing the driving rod, a gap is formed between the hook portion and the first positioning portion, and the hook surface is inclined toward the gap.

* * * * *